Patented Feb. 21, 1928.

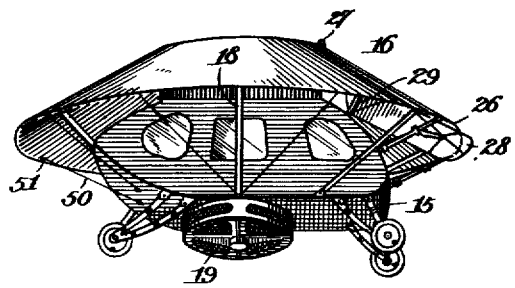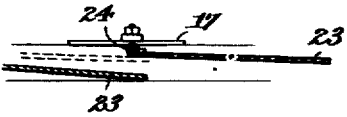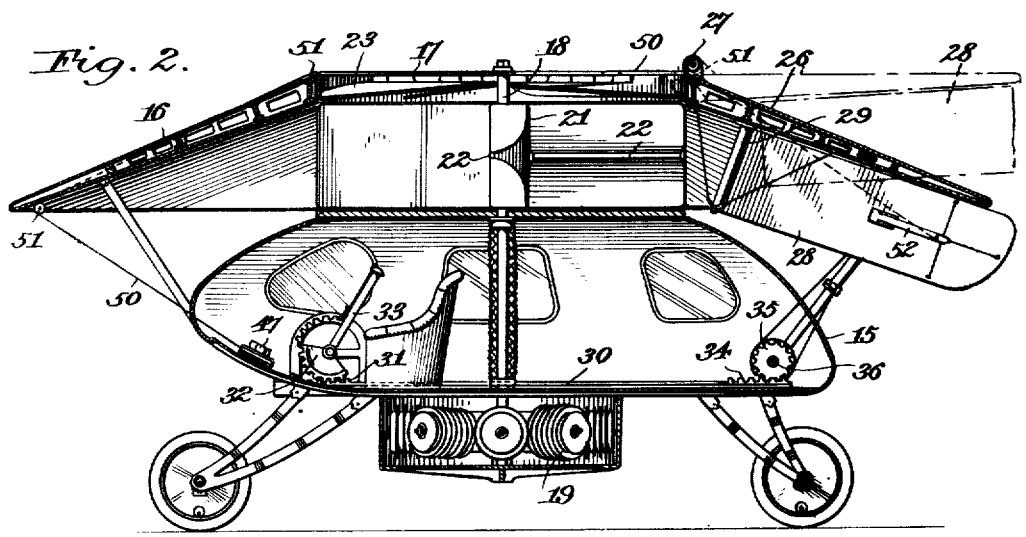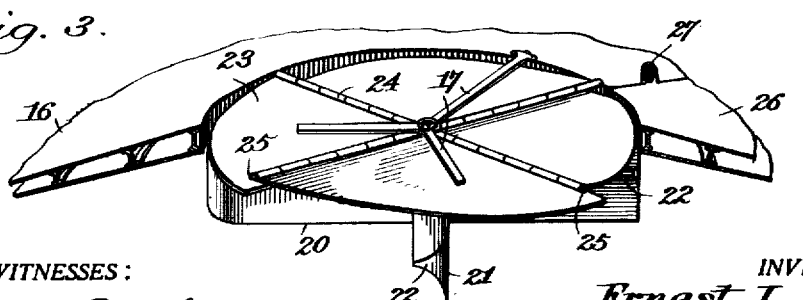

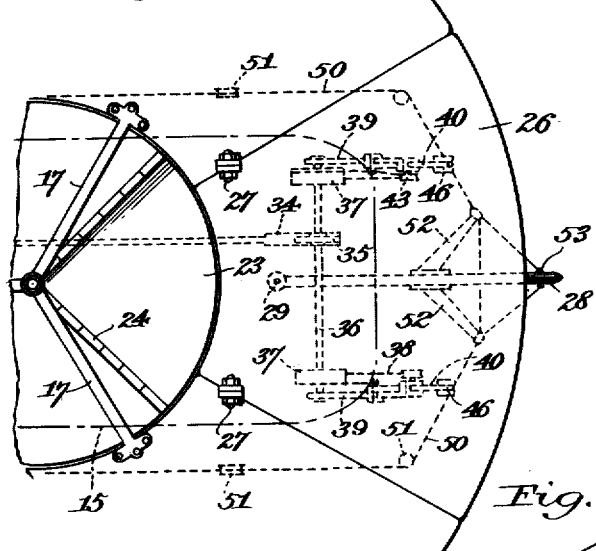
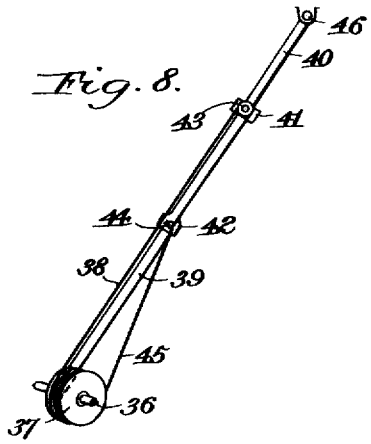
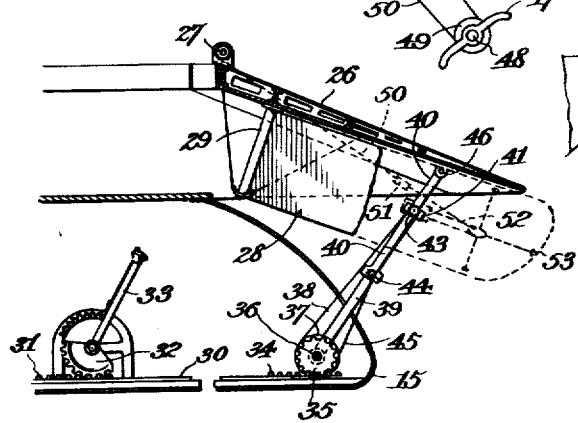
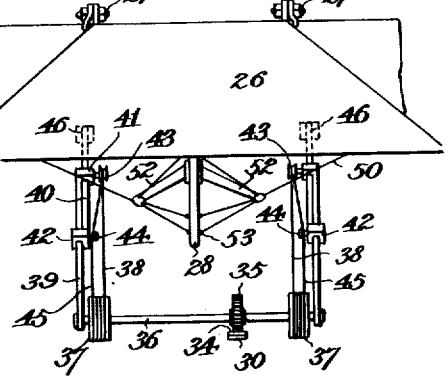
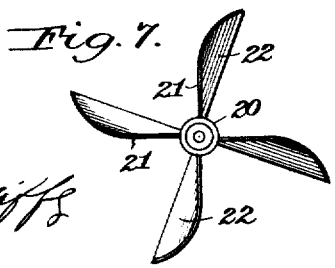

1,660,257

UNITED STATES PATENT OFFICE.

ERNEST L. CRESPO, OF NEW YORK, N. Y., ASSIGNOR OF ONE-THIRD TO JULIO AGARICIO AND ONE-THIRD TO MARIANO V. VENTURA, BOTH OF NEW YORK, N. Y.

HELICOPTER.

Application filed February 12, 1924, Serial No. 692,397. Renewed January 11, 1928.

My invention relates to a helicopter and particularly to a helicopter having means to cause rising of the helicopter and adapted also for use in causing forward movement.

The general object of my invention is to provide a helicopter having means to produce air pressure beneath a plane so formed that the air pressure will react on the atmosphere in a manner to cause the helicopter to rise, the plane being variable so that the air pressure will function to cause forward movement of the helicopter.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a helicopter embodying my invention;

Figure 2 is an enlarged longitudinal vertical section thereof, the air wheel being in side elevation;

Figure 3 is a fragmentary perspective view given to show the assemblage at the center of the plane;

Figure 4 is a detail in vertical section mainly diagrammatic, the view being given to show the closure elements in the assemblage at the center of the plane;

Figure 5 is a diagrammatic plan view at the rear of the plane;

Figure 6 is a detail in vertical section with the rudder broken away to more clearly show the manually operable hinged plane sector at the rear end of the plane;

Figure 7 is a plan view of the pressure producing wheel;

Figure 8 is a diagrammatic view of the means for raising the hinged plane sector;

Figure 9 is a diagrammatic view of a rudder operating means;

Figure 10 is a fragmentary diagrammatic rear elevation.

In carrying out my invention in accordance with the illustrated example the helicopter is made with a suitable body or frame 15. Sustained at the top of the helicopter is a plane 16 of annular form and flaring in a downward direction. At the center of the plane 16 is spider 17, a vertical shaft 18 being turnably mounted in said spider 17 and in the body 15. The shaft 18 is driven by any approved motor 19 advantageously disposed at the lower end of the shaft beneath the body 15.

An air pressure wheel 20 is fixed to the shaft 18 directly beneath the plane 16 at the center thereof below the spider 17. The wheel 20 presents a series of blades here shown as four in number, the front or working surfaces 21 of which have a curvature such that when said wheel is rotated by the turning of the motor shaft 18 a plenum of air will be maintained beneath the plane 16 and owing to the angular disposition of the flaring under surface of the plane 16, the air will be deflected downwardly by said plane and will react against the atmosphere beneath the plane to exert a lifting action on the helicopter. Each blade of the wheel 20 advantageously is formed with a central longitudinal strengthening rib 22, the sides of which curve and gradually merge into the upper and lower edge portions of the blade.

At the central portion of the plane 16 adjacent the spider 17 I provide a series of closure elements 23 which are hinged as at 24 along one edge to radial rods 25. The blades are maintained open when the wind pressure wheel 20 is in operation and the helicopter is rising so that the air is drawn downwardly through the center of the plane 16 and directed outwardly against the under side of said plane. When the machine is descending the closure elements 23 assume the closed position and constitute part of the resistance presented to the descending movement.

In order that when the helicopter has risen to the desired height and forward motion is to be given to the helicopter, I provide means to convert the air pressure developed by the wheel 20 into a forward propelling force, for which purpose a rear sector-shaped section 26 of the plane 16 is adapted to be raised to allow free rearward movement of the air under pressure in a horizontal rearward direction to react against the atmosphere at the back of the helicopter. Any suitable hinge means 27 will be provided for the section 26 to permit its ready raising and lowering. The section 26 in the illustrated form of my invention carries the rudder 28 hinged as at 29 and adapted to be turned to the right or to the left by means hereinafter described.

The operating means for raising and lowering the rear plane section 26 consists in the illustrated form of my invention of the following instrumentalities: A longitudinal bar 30 is slidably supported at the bottom of the frame or body 15 and is formed with a rack 31 at its front end, said rack engaged by a toothed sector 32 rigid with a hand lever 33. At the rear end of bar 30 a second rack 34 is formed thereon and meshes with a pinion 35 on a transverse shaft 36. The shaft 36 is provided with drums 37 about which a hoist rope 38 is given a plurality of turns. Rockably supported on the shaft 36 are bars 39 which rise obliquely from said shaft. At the upper ends of the bar 39 slide bars 40 are provided, said bars 40 having guided movement through laterally disposed heads 41 on the upper ends of the bars 39. The lower ends of the slide bars 40 have blocks 42 slidably engaging the bars 39. The heads 41 of bars 39 carry sheaves 43. One end of each rope 38 runs from the drum 37 upwardly over a sheave 43 and then downwardly and is made fast to pins or other fixed members appurtenant to the lower ends of the slide bars 40. The other terminal 45 of each rope 38 runs from a drum 37 to a pin 44. Thus, the ropes 38 are practically endless and extend from a pin 44 upwardly over a sheave 43, then downwardly to and about a drum 37 and from said drum back to the pin 44. The upper ends of the slide bars 40 are pivotally secured as at 46 to the hinged plane section 26 so that the up and down movements of said slide bars will cause raising and lowering of the plane section 26. It will be readily understood that the rocking movement of the lever 33 and its toothed sector 32 will by engagement of the rack 31 slide the bar 30 and cause its rack 34 to turn the shaft 36 through the medium of the pinion 35 and the turning of said shaft 36 will through the drums 37 and the ropes 38 cause the slide bars 40 to be raised or lowered for raising or lowering the plane section 26.

As will readily be understood various means may be operated for swinging the rudder 28 to the right or to the left. In the illustrated example a foot bar 47 is provided turning about a short shaft 48. Rigid with the shaft 48 is a drum or sheave 49 about which a rope 50 is given two or more turns, and said rope runs from the pulley to opposite sides of the rudder 28. The two runs of the rope 50 pass about a suitable arrangement of sheaves 51 at the under side of the plane 16 and to laterally disposed side arms 52 rigid with the rudder 28, the ropes having suitable connection with said side arms and the terminals of the rope being made fast to the rudder near the rear edge as at 53.

With the above described construction and with the motor running, the wheel 20 will maintain a plenum beneath, and against the under side of, the plane 16 and the reaction of the air against the atmosphere below will exert a lifting force against the plane and cause the helicopter to rise. When the machine has been raised to the desired height the section 26 of plane 16 is raised, thereby breaking the annular continuity of the downwardly flaring form of the plane and affording outlet for the air directly rearward so that the air escaping rearwardly under pressure will react against the atmosphere at the back of the plane and develop a force to cause the helicopter to move forwardly. The raising of the plane section 26 is effected by throwing the lever 33 and sliding the bar 40 to thereby turn the shaft 36 and drum 37 to exert a pull in the proper direction on ropes 38 for moving the slide bars 40.

The forward movement of the helicopter gives to it a tendency to dip owing to the flaring form of the plane 16 and hence the truncated conical form of the upper surface. The dipping tendency overcomes any tendency of the machine to rise. The lifting of the rear section also lessens the tendency of the machine to rise by relieving the upward force at the rear portion of the plane. Thus, the helicopter is maintained at a given altitude.

Reverting to the closure elements 23: Their movability causes them to open as the machine ascends whereby ample supply of air is afforded the air pressure wheel 20 through the top of the plane, and the suction of the air through the inlet afforded by the open closure elements 23 results in producing a partial vacuum above the plane which with the conical upper surface increases the tendency of the helicopter to rise under the effect of the air forced by the wheel 20 against the flaring under surface of the plane and causes the plane to rise by reason of the outwardly directed air tending to take a straight lateral course, and the reaction of the air against the atmosphere beneath. The top of the body 15 presents a closed area as at 54 beneath the wheel 20, the purpose being to prevent movement of the air in a downward direction and constrain the air to take an outward direction laterally against the flaring under side of the plane 16, so that the lifting force resulting from the tendency of the air to take a straight direction laterally outward coupled with the reaction of the air on the atmosphere beneath, will cause the helicopter to rise.

An important phase of my invention resides in the form of the plane in that the flaring character thereof gives the plane essentially the form of a parachute which resists rapid descent. For the maximum speed in the descent the motor 19 is stopped but said motor may be run at a reduced speed to control the descent under the resistance of the parachute plane. In descending and utilizing the plane as a parachute the rear section 26 is closed.

I would state in conslusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A helicopter including an annular plane flaring in a downward direction, means to maintain a plenum against and at the under side of said plane, a section of said plane being movable vertically to afford escape for air at the rear of the helicopter, a rudder carried by said movable section, means to raise and lower said movable section of the plane, and means to operate said rudder irrespective of the position of said movable plane section.

2. In a helicopter, a flaring plane, and an air pressure wheel turning about a vertical axis beneath said plane to force air laterally against the flaring under surface of the plane, said plane affording an inlet downwardly therethrough to cause air to be drawn downwardly through the plane from above the same by the turning of said wheel, hinged means to close the inlet, and means for limiting movement of the hinged means.

3. In a helicopter, a flaring plane, and an air pressure wheel turning about a vertical axis beneath said plane to force air laterally against the flaring under surface of the plane, said plane affording an inlet downwardly therethrough to cause air to be drawn downwardly through the plane from above the same by the turning of said wheel; together with closures for the air inlet of the plane, said closures mounted to swing vertically whereby to open under the suction produced by the wheel and to automatically close under resistance of the air when the helicopter descends.

ERNEST L. CRESPO.

but said motor may be run at a reduced speed to control the descent under the resistance of the parachute plane. In descending and utilizing the plane as a parachute the rear section 26 is closed.

I would state in conslusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A helicopter including an annular plane flaring in a downward direction, means to maintain a plenum against and at the under side of said plane, a section of said plane being movable vertically to afford escape for air at the rear of the helicopter, a rudder carried by said movable section, means to raise and lower said movable section of the plane, and means to operate said rudder irrespective of the position of said movable plane section.

2. In a helicopter, a flaring plane, and an air pressure wheel turning about a vertical axis beneath said plane to force air laterally against the flaring under surface of the plane, said plane affording an inlet downwardly therethrough to cause air to be drawn downwardly through the plane from above the same by the turning of said wheel, hinged means to close the inlet, and means for limiting movement of the hinged means.

3. In a helicopter, a flaring plane, and an air pressure wheel turning about a vertical axis beneath said plane to force air laterally against the flaring under surface of the plane, said plane affording an inlet downwardly therethrough to cause air to be drawn downwardly through the plane from above the same by the turning of said wheel; together with closures for the air inlet of the plane, said closures mounted to swing vertically whereby to open under the suction produced by the wheel and to automatically close under resistance of the air when the helicopter descends.

ERNEST L. CRESPO.

CERTIFICATE OF CORRECTION.

Patent No. 1,660,257.     Granted February 21, 1928, to

ERNEST L. CRESPO.

It is hereby certified that error appears in the above numbered patent requiring correction as follows: In the grant, and in the heading to the printed specification, assignment, name of first mentioned assignee, for "Julio Agaricio" read "Julio Aparicio", as shown by the records of assignments in this office; and that the said Letters Patent should be read with this correction therein that the same may conform to the record of the case in the Patent Office.

Signed and sealed this 27th day of March, A. D. 1928.

Seal.

M. J. Moore,
Acting Commissioner of Patents.

CERTIFICATE OF CORRECTION.

Patent No. 1,660,257. Granted February 21, 1928, to

ERNEST L. CRESPO.

It is hereby certified that error appears in the above numbered patent requiring correction as follows: In the grant, and in the heading to the printed specification, assignment, name of first mentioned assignee, for "Julio Agaricio" read "Julio Aparicio", as shown by the records of assignments in this office; and that the said Letters Patent should be read with this correction therein that the same may conform to the record of the case in the Patent Office.

Signed and sealed this 27th day of March, A. D. 1928.

Seal.

M. J. Moore,
Acting Commissioner of Patents.